United States Patent
Viola et al.

(10) Patent No.: US 8,186,151 B2
(45) Date of Patent: May 29, 2012

(54) METHOD TO MONITOR HC-SCR CATALYST NOX REDUCTION PERFORMANCE FOR LEAN EXHAUST APPLICATIONS

(75) Inventors: Michael B. Viola, Macomb Township, MI (US); Steven J. Schmieg, Troy, MI (US); Thompson M. Sloane, Oxford, MI (US); David L. Hilden, Shelby Township, MI (US); Patricia A. Mulawa, Clinton Township, MI (US); Jong H. Lee, Rochester Hills, MI (US); Shi-Wai S. Cheng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 417 days.

(21) Appl. No.: 12/480,932

(22) Filed: Jun. 9, 2009

(65) Prior Publication Data

US 2010/0307140 A1 Dec. 9, 2010

(51) Int. Cl.
*F01N 3/00* (2006.01)
(52) U.S. Cl. .............. 60/295; 60/274; 60/285; 60/286; 60/301
(58) Field of Classification Search .............. 60/274, 60/284–287, 295–301
See application file for complete search history.

(56) References Cited

U.S. PATENT DOCUMENTS

| | | | | |
|---|---|---|---|---|
| 5,802,843 A * | 9/1998 | Kurihara et al. | ................. | 60/274 |
| 6,199,372 B1 * | 3/2001 | Wakamoto | ...................... | 60/274 |
| 6,314,723 B1 * | 11/2001 | Ketterer et al. | .................. | 60/277 |
| 6,829,885 B2 * | 12/2004 | Surnilla et al. | .................. | 60/274 |
| 7,093,427 B2 * | 8/2006 | van Nieuwstadt et al. | ...... | 60/286 |
| 2007/0245714 A1 * | 10/2007 | Frazier et al. | .................... | 60/276 |
| 2008/0022664 A1 * | 1/2008 | Reuter et al. | .................... | 60/286 |
| 2008/0066454 A1 | 3/2008 | Viola | | |
| 2008/0066455 A1 | 3/2008 | Viola | | |
| 2008/0104946 A1 * | 5/2008 | Wang et al. | ...................... | 60/295 |
| 2008/0250778 A1 * | 10/2008 | Solbrig | ............................ | 60/301 |
| 2008/0271440 A1 * | 11/2008 | Xu et al. | .......................... | 60/295 |
| 2010/0115924 A1 * | 5/2010 | Gabe et al. | ....................... | 60/285 |

OTHER PUBLICATIONS

U.S. Appl. No. 12/568,754, Steven Schmieg et al.

\* cited by examiner

*Primary Examiner* — Thomas Denion
*Assistant Examiner* — Jesse Bogue

(57) ABSTRACT

A method for initiating a regeneration mode in selective catalytic reduction device utilizing hydrocarbons as a reductant includes monitoring a temperature within the aftertreatment system, monitoring a fuel dosing rate to the selective catalytic reduction device, monitoring an initial conversion efficiency, selecting a determined equation to estimate changes in a conversion efficiency of the selective catalytic reduction device based upon the monitored temperature and the monitored fuel dosing rate, estimating changes in the conversion efficiency based upon the determined equation and the initial conversion efficiency, and initiating a regeneration mode for the selective catalytic reduction device based upon the estimated changes in conversion efficiency.

16 Claims, 10 Drawing Sheets

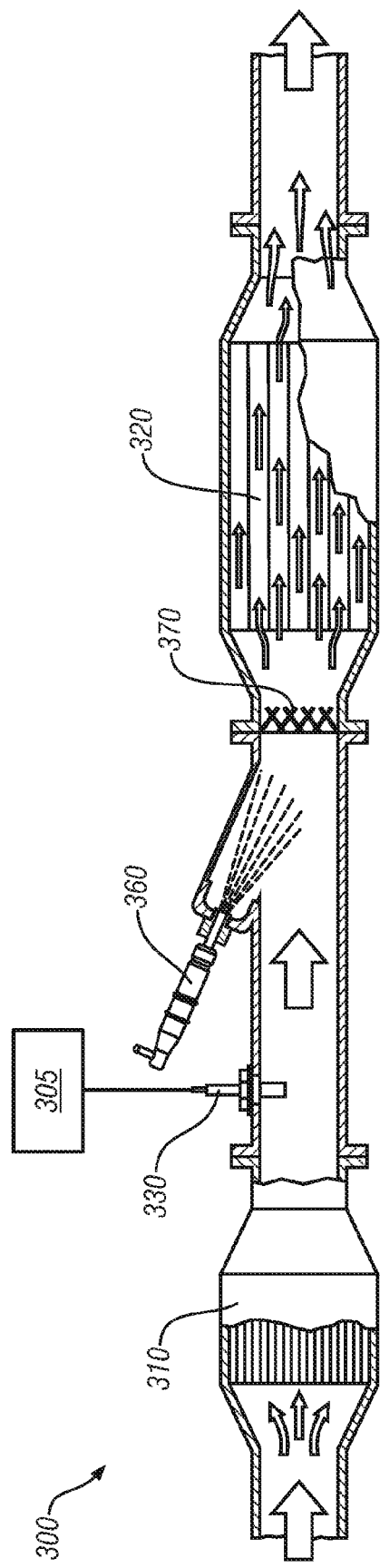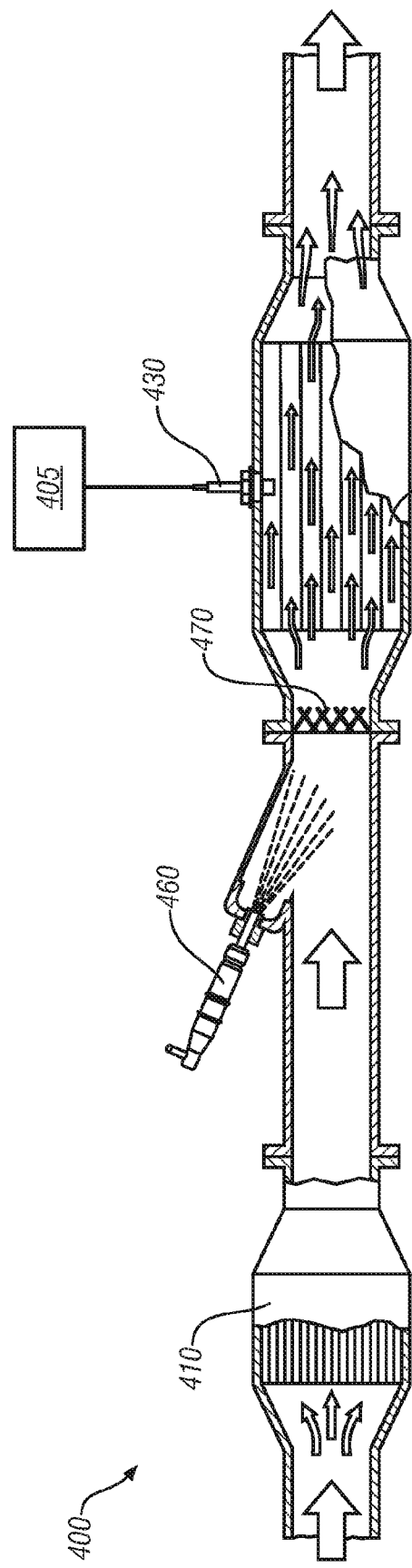

METHOD TO MONITOR HC-SCR CATALYST NOX REDUCTION PERFORMANCE FOR LEAN EXHAUST APPLICATIONS

GOVERNMENT CONTRACT RIGHTS

The U.S. Government has a paid-up license in this invention and the right in limited circumstances to require the patent owner to license others on reasonable terms as provided for by the terms of Cooperative Agreement Number DE-FC26-02NT41218 awarded by the U.S. Department of Energy.

TECHNICAL FIELD

This disclosure is related to control of aftertreatment of NOx emissions in internal combustion engines.

BACKGROUND

The statements in this section merely provide background information related to the present disclosure and may not constitute prior art.

Emissions control is an important factor in engine design and engine control. One particular combustion by-product, NOx, is created by nitrogen and oxygen molecules present in engine intake air disassociating in the high temperatures of combustion. Rates of NOx creation include known relationships to the combustion process, for example, with higher rates of NOx creation being associated with higher combustion temperatures and longer exposure of air molecules to the higher temperatures. Reduction of NOx created in the combustion process and management of NOx in an exhaust aftertreatment system are priorities in vehicle design.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas flow temperatures.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder. While temperatures in the combustion chamber can get high enough in pockets of combustion to create significant quantities of NOx, the overall energy output of the combustion chamber, in particular, the heat energy expelled from the engine through the exhaust gas flow, can be greatly reduced from normal values. Such conditions can be challenging to exhaust aftertreatment strategies, since, as aforementioned, aftertreatment devices frequently require an elevated operating temperature, driven by the exhaust gas flow temperature, to operate adequately to treat NOx emissions.

Aftertreatment devices are known, for instance, utilizing catalysts to treat the exhaust gas flow and catalysts capable of storing some amount of NOx, and engine control technologies have been developed to combine these NOx traps or NOx adsorbers with fuel efficient engine control strategies to improve fuel efficiency and still achieve acceptable levels of NOx emissions. One exemplary strategy includes using a NOx trap to store NOx emissions during fuel lean operations and then purging the stored NOx during fuel rich, higher temperature engine operating conditions with conventional three-way catalysis to nitrogen and water. However, catalysts and NOx traps are dependent upon properties of the exhaust gas to operate efficiently. These methods can be temperature and engine range limiting. A selective catalytic reduction device (SCR) is known to additionally treat the exhaust gas flow utilizing a reductant, extending the aftertreatment capabilities of the aftertreatment system.

One known configuration of SCR utilizes ammonia derived from urea injection or recovered from normal operation of a three-way catalyst device as a reductant to treat NOx. Another known configuration utilizes a hydrocarbon selective catalytic reduction device (HC-SCR), wherein unburnt hydrocarbons, either injected in the exhaust gas flow or carried through from the combustion chamber, are utilized as a reductant to treat NOx. In either method, accurate dosing of the reductant is important to proper function of the device. Additionally, SCRs are dependent upon proper function of the catalyst within the device. Conditions can occur which reduce the efficiency of the catalyst. One particular example, in diesel applications, includes diesel fuel or sulfur poisoning of the catalysts. Such conditions can frequently be remedied, for example, through a regeneration cycle, when detected. One exemplary method to track and diagnose poisoned or otherwise malfunctioning catalysts is to monitor conversion of NOx within the device or the conversion efficiency of the device. Such diagnoses require monitoring of parameters indicative of NOx treatment.

A NOx sensor or an oxygen sensor add cost and weight to a vehicle, and such sensors frequently require a particular operating temperature range, achieved after some warm-up time, to be functional. There exist methods to estimate engine-out NOx via detailed combustion modeling using heat release model, multi-zone combustion model and Zodovich chemical kinetic equations. This detailed modeling, although it is good for analysis, may not be appropriate for in-vehicle engine control module (ECM) applications because of complicated programming and calibration requirements. Additionally, such models are sensitive to sensor tolerance and aging, pose a large computational burden upon the ECM, and require processing time not providing results in real-time.

SUMMARY

An aftertreatment system includes a selective catalytic reduction device utilizing hydrocarbons as a reductant. A method for initiating a regeneration mode in the selective catalytic reduction device includes monitoring a temperature within the aftertreatment system, monitoring a fuel dosing rate to the selective catalytic reduction device, monitoring an initial conversion efficiency, selecting a determined equation to estimate changes in a conversion efficiency of the selective catalytic reduction device based upon the monitored temperature and the monitored fuel dosing rate, estimating changes in the conversion efficiency based upon the determined equation and the initial conversion efficiency, and initiating a regeneration mode for the selective catalytic reduction device based upon the estimated changes in conversion efficiency.

BRIEF DESCRIPTION OF THE DRAWINGS

One or more embodiments will now be described, by way of example, with reference to the accompanying drawings, in which:

FIG. 5 depicts data gathered from a catalyst operating under constant fuel dosing of hydrocarbons at a constant exhaust temperature, in accordance with the present disclosure;

FIG. 6 depicts data gathered from a catalyst operating under constant fuel dosing with temperature increasing, in accordance with the present disclosure;

FIGS. 7-9 schematically depict temperature measurements being taken from various points within the aftertreatment system, in accordance with the present disclosure;

FIG. 7 graphically depicts an aftertreatment system including an upstream temperature sensor, in accordance with the present disclosure;

FIG. 8 graphically depicts an aftertreatment system including an in-catalyst temperature sensor, in accordance with the present disclosure;

FIG. 9 graphically depicts an aftertreatment system including a downstream temperature sensor, in accordance with the present disclosure;

DETAILED DESCRIPTION

Figure 1:
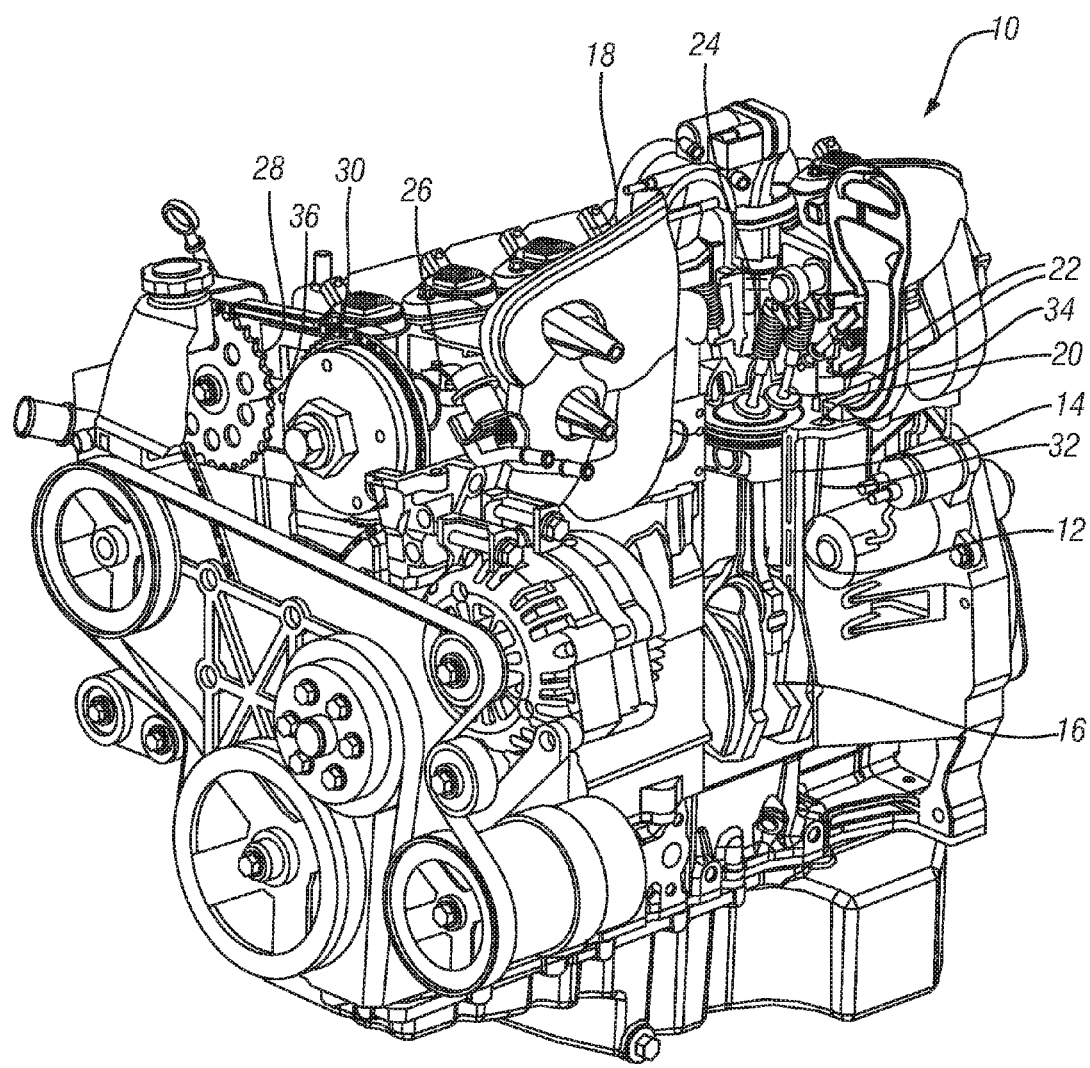
FIG. 1 schematically depicts an exemplary internal combustion engine and control system which has been constructed, in accordance with the present disclosure.

Referring now to the drawings, wherein the showings are for the purpose of illustrating certain exemplary embodiments only and not for the purpose of limiting the same, FIG. 1 is a sectional representation of an exemplary diesel engine, in accordance with the present disclosure. Engine 10 conventionally includes a plurality of cylinders 12 having therein reciprocable pistons 14 connected with a crankshaft 16. This disclosure is generally applicable to direct injection four-stroke compression ignition engines. The ends of the cylinder are closed by a cylinder head 18 so that the cylinders and pistons define variable volume combustion chambers 20.

The cylinder head is provided with intake valves 22 which control the timing and flow of intake air into the cylinders during intake strokes of the pistons. Exhaust valves 24 in the cylinder head control timing and flow of exhaust products from the combustion chambers during exhaust strokes of the pistons. In the engine shown there are two intake valves and two exhaust valves for each cylinder, however, any suitable number of valves provided for operation of the engine may be utilized in accordance with the disclosure.

The intake and the exhaust valves are actuated by separate valve actuation devices 26, 28. The valve actuation devices exclusively operate their respective intake and exhaust valves, however, both are driven by the crankshaft 16 through a timing chain 30.

The exemplary engine 10 includes a cast-metal engine block with a plurality of cylinders formed therein and an engine head. The engine block preferably includes coolant passages 32 through which engine coolant fluid passes. A coolant temperature sensor, operable to monitor temperature of the coolant fluid, is located at an appropriate location, and provides a parametric signal input to a control system indicative of engine operating temperature useful in engine control. The engine preferably includes known systems including an external exhaust gas recirculation (EGR) valve and an intake air throttle valve (not shown).

Each piston 14 is connected via a pin and connecting rod to the crankshaft 16. The crankshaft 16 is rotatably attached to the engine block at a main bearing area near a bottom portion of the engine block, such that the crankshaft is able to rotate around an axis that is perpendicular to a longitudinal axis defined by each cylinder. A crank sensor (not shown) is placed in an appropriate location, operable to generate a signal that is useable by the controller to measure crank angle, and which is translatable to provide measures of crankshaft rotation, speed, and acceleration that are useable in various control schemes. During operation of the engine, each piston 14 moves up and down in the cylinder in a reciprocating fashion due to connection to and rotation of the crankshaft 16, and the combustion process. The rotation action of the crankshaft effects translation of linear force exerted on each piston during combustion to an angular torque output from the crankshaft, which can be transmitted to another device, e.g. a vehicle driveline.

The engine head comprises a cast-metal device having one or more intake ports and one or more exhaust ports which flow to the combustion chamber 20. The intake port supplies air to the combustion chamber 20. Combusted (burned) gases flow from the combustion chamber 20 via the exhaust port. Flow of air through each intake port is controlled by actuation of one or more intake valves 22. Flow of combusted gases through each exhaust port is controlled by actuation of one or more exhaust valves 24.

The intake and exhaust valves 22, 24 each have a head portion that includes a top portion that is exposed to the combustion chamber. Each of the valves 22, 24 has a stem that is connected to a valve actuation device. A valve actuation device 26 is operative to control opening and closing of each of the intake valves 22, and a second valve actuation device 28 operative to control opening and closing of each of the exhaust valves 24. Each of the valve actuation devices 26, 28 comprises a device signally connected to the control system and operative to control timing, duration, and magnitude of opening and closing of each valve, either in concert or individually. One embodiment of the exemplary engine comprises a dual overhead cam system which has variable lift control (VLC) and variable cam phasing (VCP) devices as part of the valve actuation devices 26, 28. VCP devices are operative to control timing of opening or closing of each intake valve and each exhaust valve relative to rotational position of the crankshaft and opens each valve for a fixed crank angle duration. VLC devices are operative to control magnitude of valve lift to one of two positions: on exemplary configuration includes one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port through an intake manifold runner 34, which receives filtered air passing through a known air metering device and a throttle device (not shown). Exhaust gas passes from the exhaust port to an exhaust manifold, which includes exhaust gas sensors operative to monitor constituents of the exhaust gas flow, and determine parameters associated therewith. The exhaust gas sensors can comprise any of several known sensing devices operative to provide parametric values for the exhaust gas flow, including air/fuel ratio, or measurement of exhaust gas constituents, e.g. NOx, CO, HC, and others. The system may include an in-cylinder sensor for monitoring combustion pressures, or non-intrusive pressure sensors or inferentially determined pressure determination (e.g. through crankshaft accelerations). The aforementioned sensors and metering devices each provide a signal as a parametric input to the control system. These parametric inputs can be used by the control system to determine combustion performance measurements.

The control system preferably comprises a subset of an overall control architecture operable to provide coordinated system control of the engine 10 and other systems. In overall operation, the control system is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system is operably connected to a plurality of devices through which an operator controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network (LAN) bus (not shown) which preferably allows for structured communication of control parameters and commands between various controllers.

The control system is operably connected to the engine 10, and functions to acquire parametric data from sensors, and control a variety of actuators of the engine 10 over appropriate interfaces. The control system receives an engine torque command, and generates a desired torque output, based upon the operator inputs. Exemplary engine operating parameters that are sensed by control system using the aforementioned sensors include engine coolant temperature, crankshaft rotational speed (RPM) and position, manifold absolute pressure, ambient air flow and temperature, and ambient air pressure. A sensor capable of monitoring crankshaft rotational position can be utilized to monitor or determine a progression of the engine and various cylinders through various stages of a combustion cycle. Combustion performance measurements may comprise measured and inferred combustion parameters, including air/fuel ratio, location of peak combustion pressure, among others.

Actuators controlled by the control system include: fuel injectors (not shown); the VCP/VLC valve actuation devices 26, 28; EGR valve (not shown), and, electronic throttle control module (not shown). Fuel injectors are preferably operable to inject fuel directly into each combustion chamber 20.

The control system preferably comprises a general-purpose digital computer generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the desired functions.

Algorithms for engine control may be executed during preset loop. Algorithms stored in the non-volatile memory devices are executed by the central processing unit and are operable to monitor inputs from the sensing devices and execute control and diagnostic routines to control operation of the engine, using preset calibrations. Loop cycles may be executed at regular intervals, for example each 3.125, 6.25, 12.5, 25 and 100 milliseconds during ongoing engine operation. Alternatively, algorithms may be executed in response to occurrence of an event or interrupt request.

FIG. 1 describes an exemplary diesel engine. However, it will be appreciated that NOx treatment and aftertreatment systems are utilized in other engine configurations including gasoline engines, and the disclosure is not intended to be limited to the specific exemplary engine embodiment described herein.

Figure 2:
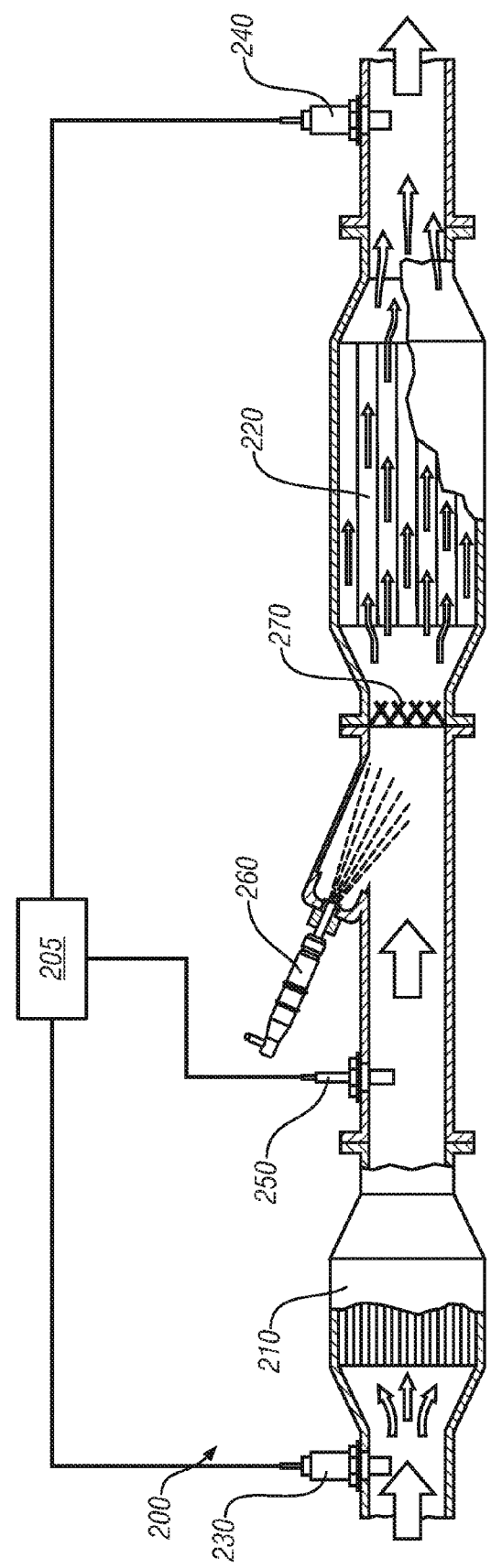
FIG. 2 schematically illustrates an exemplary aftertreatment system including an HC-SCR device configuration, in accordance with the present disclosure.

FIG. 2 schematically illustrates an exemplary aftertreatment system including an HC-SCR device configuration, in accordance with the present disclosure. Aftertreatment system 200 comprises a control module 205, DOC 210, HC-SCR 220, upstream NOx sensor 230, downstream NOx sensor 240, temperature sensor 250, and fuel dosing module 260. As is known in the art, DOC 210 performs a number of catalytic functions necessary to aftertreatment of an exhaust gas flow. HC-SCR 220 utilizes fuel as a reactant to reduce NOx into nonpolluting molecules. Upstream NOx sensor 230 detects and quantifies NOx in the exhaust gas flow entering aftertreatment system 200. While upstream NOx sensor 230 is illustrated as an exemplary means to quantify NOx entering the aftertreatment system, it should be noted that NOx entering the system can be quantified for use in evaluating conversion efficiency in an HC-SCR by other means, for example, through a NOx sensor located between DOC 210 and SCR 220. This disclosure in general discusses a sensor input describing NOx entering the aftertreatment system in accordance with the exemplary embodiment, however it will be appreciated that, depending upon upstream sensor placement, the input could actually describe NOx content entering a portion of the aftertreatment system. Further, methods are known to estimate NOx content in an exhaust gas flow entering the aftertreatment system based upon engine operation, wherein this estimation can be described as a virtual NOx sensor. Operation of an exemplary virtual NOx sensor is described in more detail below. HC-SCR 220 utilizes hydrocarbons to convert NOx to nonpolluting molecules by methods known in the art. Temperature sensor 250 is depicted, located in a region to gather exhaust gas flow temperatures within the aftertreatment system 200. Fuel dosing module 260 is depicted in a position upstream of HC-SCR 220. The fuel can be directly sprayed into the exhaust gas flow entering the HC-SCR. However, a preferred method is depicted, utilizing a mixer device 270. Fuel dosing module 260 injects fuel onto mixer device 270, and the fuel is then carried by the exhaust gas flow in a substantially even distribution onto the catalyst surfaces on the interior of HC-SCR 220. Additionally or alternatively, it is possible to add HC to the exhaust gas flow by late or post combustion injection within the combustion chamber. Downstream NOx sensor 240 detects and quantifies NOx in the exhaust gas flow exiting aftertreatment system 200. Control module 205 includes programming required to process inputs related to the aftertreatment system and control parameters in the treatment of NOx in the system.

By placing NOx sensors before and after an aftertreatment device, an estimation can be made regarding the effectiveness of the device in converting the NOx. The exemplary aftertreatment system described above describes a measured or estimated NOx content of the exhaust gas flow measured upstream of the aftertreatment device being analyzed. This measure of NOx entering the aftertreatment system can be described at any time t as x(t). The exemplary aftertreatment system described above describes a measured or estimated NOx content of the exhaust gas flow measured downstream of the aftertreatment device being analyzed. This measure of NOx exiting the aftertreatment system can be described at any time as y(t). Conversion efficiency at any given time by the following equation.

$$\eta_{ACTUAL}(t) = 1 - \frac{y(t)}{x(t)} \quad [1]$$

It will be appreciated that this equation provides the conversion efficiency at any instant in time. Such instantaneous measurements or calculations are prone to error based upon signal noise. Methods to apply a low pass filter are known in the art. An integration of x(t) or y(t) yields a description of a quantity of actual NOx to enter or exit the aftertreatment system through a time period, respectively. An exemplary equation to determine an integrated conversion efficiency, filtering anomalous measurements in x(t) and y(t), can be described as follows.

$$\eta = f(T_{BED}, SV, \theta_{NH_3}, x(t), V_{UREA}, \rho_{CELL}) \quad [2]$$

In this way, measured or estimated values of NOx entering and exiting the aftertreatment system can be utilized to determine an estimated or calculated actual conversion efficiency of the aftertreatment system.

Conversion efficiency can, in this way, be determined according to NOx entering the aftertreatment device and NOx exiting the aftertreatment device. Determined in this way, conversion efficiency is tracked as a net conversion accomplished in the device at time t. However, other methods to track, estimate, or predict conversion efficiency are possible.

Figure 3:
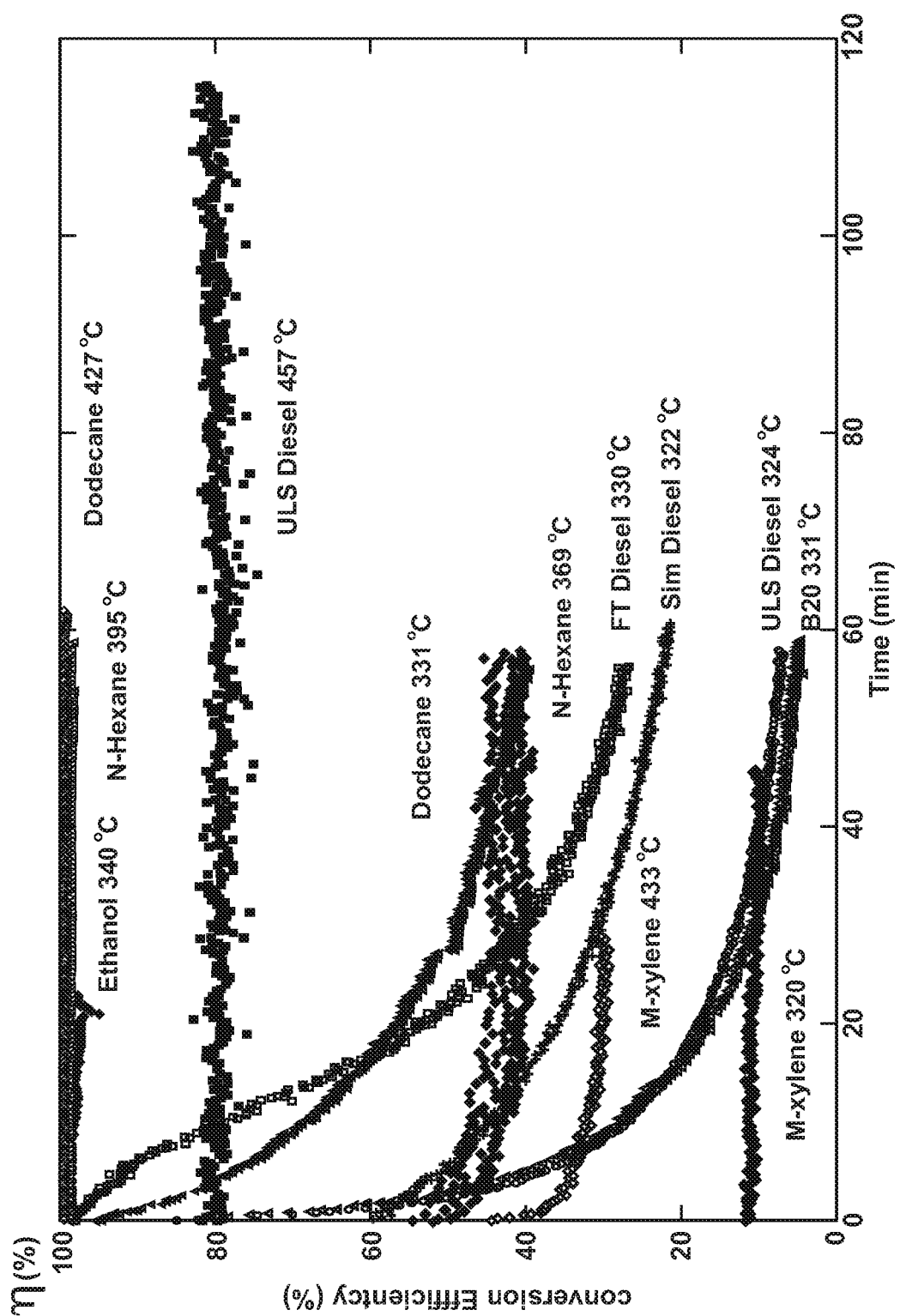
FIG. 3 graphically depicts exemplary results of an HC-SCR catalyst exposed to a number of hydrocarbon reductants at different temperatures, in accordance with the present disclosure.
Figure 4:
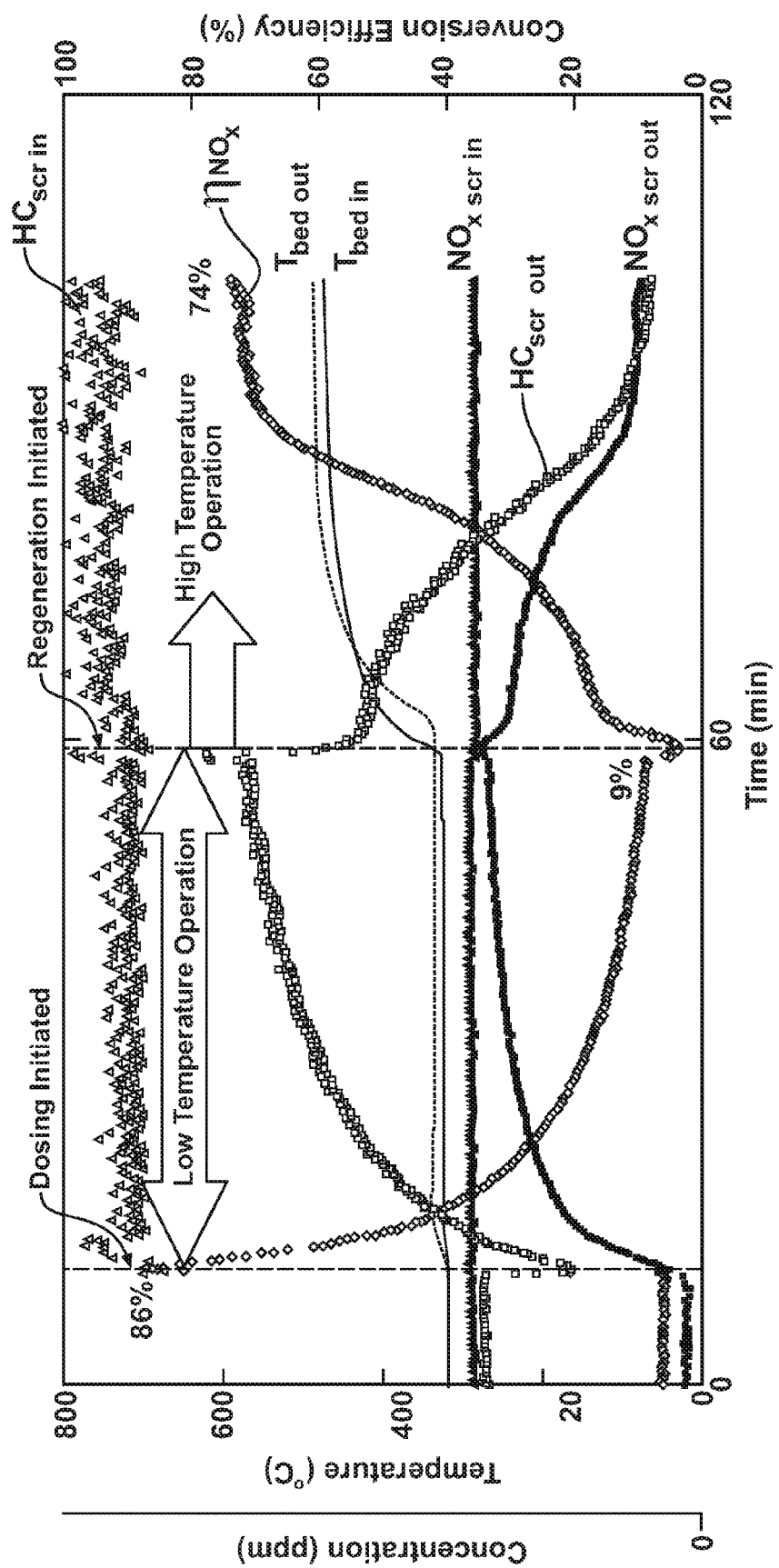
FIG. 4 graphically depicts exemplary test results of at catalyst being operated in two temperature ranges and resulting effects to conversion efficiency, in accordance with the present disclosure.

Conversion of NOx within an aftertreatment device is subject to reduced efficiency over time and under certain conditions based upon poisoning or contamination of the catalyst, resulting in deactivation of the catalyst. Testing has shown that this process of poisoning the catalyst is a predictably repeatable behavior based upon the reductant utilized, the temperature of the catalyst within the device, and the duration of the exposure of the catalyst under those conditions. FIG. 3 graphically depicts exemplary results of an HC-SCR catalyst exposed to a number of hydrocarbon reductants at different temperatures, in accordance with the present disclosure. Examination of the test results yields different conclusions for different reductants. Most reductants depicted exhibit greater drops in conversion efficiency over time for lower operating temperatures. This behavior is consistent with the requirement to regenerate the SCR catalyst after an amount of time operating at operating temperatures in a lower range, as is typical with lean engine operation. However, above a certain operating temperature, reductants exhibit little or no degradation of conversion efficiency over time. Operation at these higher temperatures is consistent with operation that purges or regenerates contaminants from the catalyst. FIG. 4 graphically depicts exemplary test results of a catalyst being operated in two temperature ranges and resulting effects to conversion efficiency, in accordance with the present disclosure. Test conditions included a four cylinder diesel engine and constant ultra low sulfur diesel fuel (ULSD) hydrocarbon dosing injected upstream of the HC-SCR catalyst shown. Dosing is initiated on a fresh, unpoisoned catalyst, and operation of the catalyst to convert NOx with hydrocarbons begins at high efficiency. During operation at low temperature, the catalyst exhibits progressively degraded conversion efficiency consistent with FIG. 3. Accompanying the decreased conversion efficiency, post-SCR concentrations of hydrocarbons (HCscr_out) and NOx (NOx_scr_out) increase, consistent with the reductant and the NOx not undergoing the intended reaction. In the middle of the graph, regeneration at high temperature is initiated. High temperatures cause regeneration of the catalyst and restoration of some or all of the conversion efficiency lost during the preceding low temperature operation. Post-SCR concentrations of hydrocarbons (HCscr_out) and NOx (NOx_scr_out) decrease after regeneration is initiated, consistent with the reductant and the NOx undergoing the intended reaction.

Figure 5:
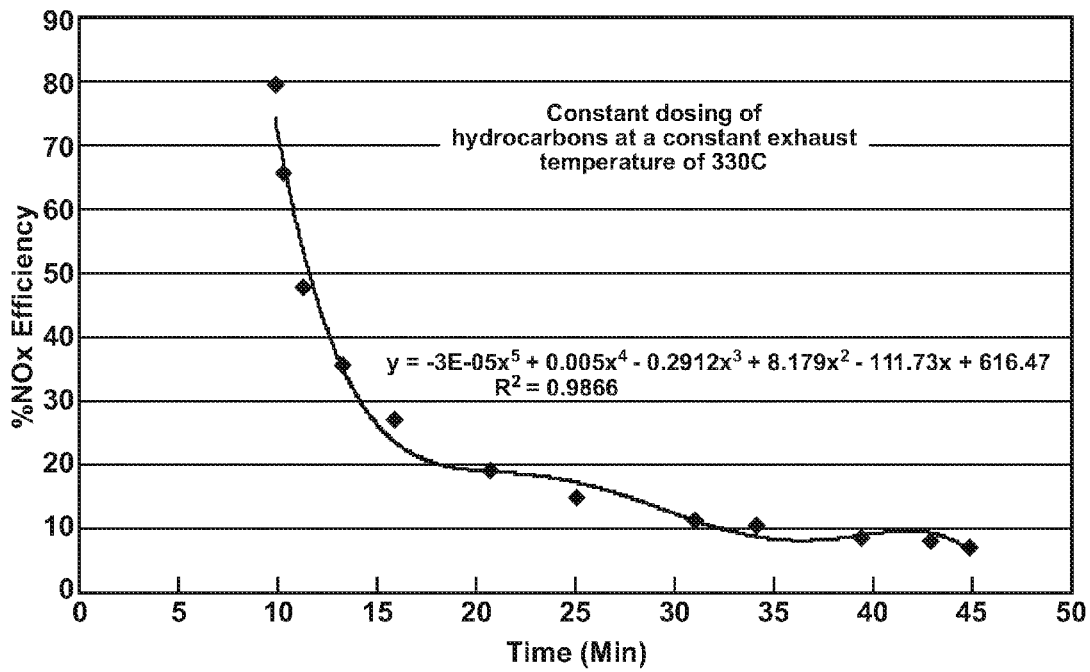
FIGS. 5 and 6 graphically depict exemplary test results and determined equations representing the behavior of the test results, achieved by curve fitting methods, in accordance with the present disclosure.
Figure 6:
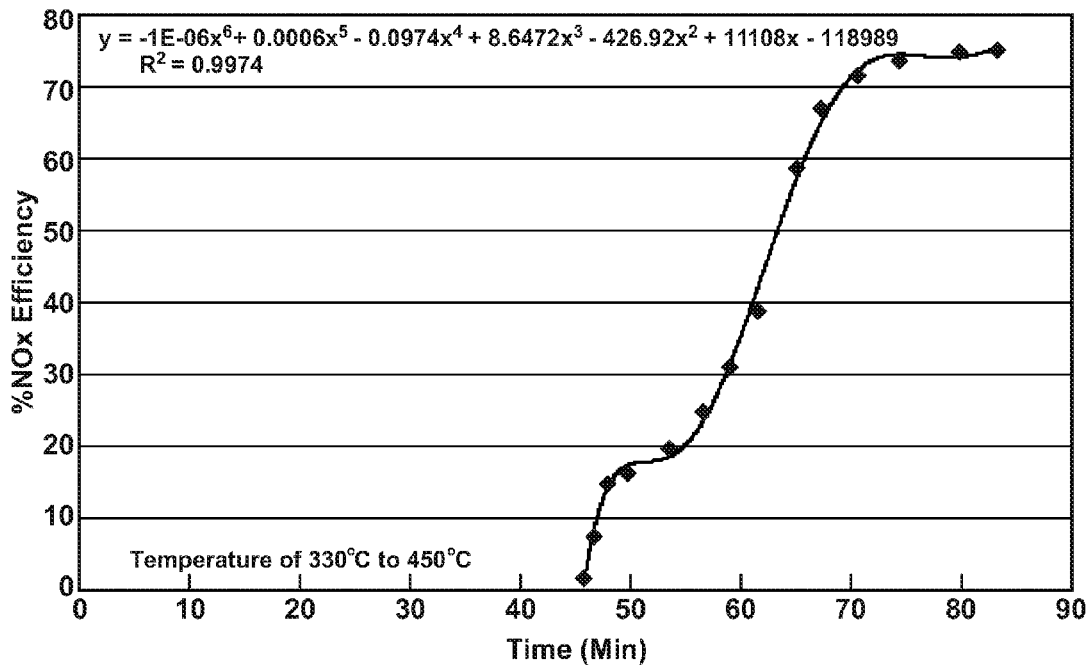

Testing has shown that reductions and restorations of conversion efficiency under given conditions undergo repeatable changes under the same operating conditions. By examining test results from an exemplary test system and fitting a curve, comprising a polynomial equation, by methods known in the art to the test results, resulting conversion efficiency after a period of operation can be predicted based upon the determined curve. In this way, testing of an exemplary SCR device can be used to determined equations for use in controlling operative SCR devices. FIGS. 5 and 6 graphically depict exemplary test results and determined equations representing the behavior of the test results, achieved by curve fitting methods, in accordance with the present disclosure. FIG. 5 depicts data gathered from a catalyst operating under constant fuel (ULSD) dosing of hydrocarbons at a constant exhaust temperature of 330° C. A resulting determined equation is depicted, fitted to the data points gathered from the experimental data and describing increasing deactivation of the catalyst. Because the reduction in conversion efficiency at the tested condition is repeatable, given a starting point, resulting conversion efficiency of the device can be predicted after some time of operation at the tested condition. Likewise, FIG. 6 depicts data gathered from a catalyst operating under constant fuel dosing with temperature increasing from 330° C. to 450° C. A resulting determined equation is depicted, fitted to the data points gathered from the experimental data and describing increasing regeneration of the catalyst. By assembling equations for various operating conditions, changes in conversion efficiency can be predicted based upon changes in operating conditions and the time at each operating condition.

Operation of a catalyst in an aftertreatment device with a known starting state under known conditions yields predictable changes in conversion efficiency in the device. This repeatable behavior allows for tracking of predicted conversion efficiency by monitoring operating conditions. An exemplary equation to track conversion efficiency can be expressed by the following exemplary equation.

$$\eta(t_N) = \eta(t_0) + \Sigma_{x=1}^{N}(\text{determined\_equation}_x(t))_{t_{x-1}}^{t_x} \quad [3]$$

Conversion efficiency some desired time, $\eta(t_N)$, can be determined based upon an initial conversion efficiency, $\eta(t_0)$, and a summing of the effects of operation during a number, N, of periods at known operating conditions. For each period x of N periods of operation, a time period of $t_{x-1}$ to $t_x$ can be defined, and the determined equation for each period x, determined by methods described above, is utilized to determine the effects of operation at the conditions for that period.

As described above, operation at high temperatures tends to increase conversion efficiency. At or above certain temperatures, high temperatures can lead to unintended regeneration. Determined equations should be calibrated and temperature ranges should be selected for the equations to take this unintended regeneration into consideration. In exemplary catalyst devices, unintended regeneration was experienced at exhaust gas flow temperatures exceeding 400° F. and especially above 450° F. However, it will be appreciated that regeneration temperature ranges are highly catalyst dependent.

As described above, behavior of a catalyst can be described for various conditions, such as temperature ranges. Temperature dependence of a device can vary depending upon catalyst formulation. As determined equations are developed for a specific catalyst, Equation 3 or similar equations can be utilized to evaluate the impact of operation upon conversion efficiency. Given a set of known determined equations, Equation 3 can be restated as the following.

$$\eta(t_N) = \eta(t_0) + f(A_{T=330-350} + B_{T=351-380} + C_{T=381-410} + \ldots) - D_{T=411-449} - E_{T>450} \quad [4]$$

As described in relation to Equation 3, conversion efficiency is calculated by determining $\eta(t_0)$ and summing a change in efficiency over time. The equations for the different monitored temperature ranges can be developed by any method sufficient to estimate conversion efficiency for a particular aftertreatment device through different temperature ranges. Example determined equations are depicted in FIGS. 5 and 6. In this way, conversion efficiency for an SCR catalyst can be predicted based upon monitored temperatures in the exhaust gas flow.

The initial conversion efficiency can be determined or estimated in a number of ways. A new catalyst can include a set, clean conversion efficiency. One preferred method to set an initial conversion efficiency during operation of the system is to reset the estimated conversion efficiency once operating conditions indicate that a full regeneration has taken place. In another embodiment, an initial conversion efficiency can be reset to an estimated conversion efficiency based upon some condition allowing such an estimation. For example, a partial regeneration yields predictable restoration of the conversion efficiency even given an inexact conversion efficiency estimate at the start of the regeneration. The estimated conversion efficiency reset after a condition such as a partial regeneration can be set according to any method sufficient to adequately evaluate conversion efficiency within the subject aftertreatment device. When operating conditions for the catalyst include high temperature operation above a threshold temperature for more than a threshold duration, the initial conversion efficiency can be reset to a maximum value or a value calibrated to the catalyst based upon the conditions of the regeneration, the reductant in use, the state of the catalyst within an expected lifespan of the catalyst, or other factors affecting conversion efficiency of a catalyst after full regeneration.

Determined equations can be created by fitting a curve to test data, as described above, in order to estimate or predict conversion efficiency resulting from operation of a catalyst under known or measured conditions. Conditions suitable for use of a single determined equation can vary based upon the aftertreatment device; the sensitivity of the catalyst used to changes in temperature, fuel composition, or other factors; transitory conditions in the exhaust gas flow; and other factors that can create variability or errors in the resulting conversion efficiency to the conversion efficiency predicted by the determined equations. For example, a determined equation can be set for use in a period wherein the measure exhaust gas temperature is between 350° C. and 375° C. if testing shows that the resulting conversion efficiency when operating that range is consistently affected within an acceptable margin of error. Equations can be defined for operating condition ranges spanning each 10, 20, 50° C., or any increment in exhaust gas temperature, as made reasonable by analysis of test results. Similarly, different equations can be defined for different ranges of fuel dosing quantity. The curves and equations will differ depending on the catalyst size, loading, fuel reductant type and formulation, and dosing quantity. Similarly, as described in FIG. 6, a determined equation can be set for use in a transitory period, wherein the exhaust gas temperature is expected or measured to transition from one value to another, for example, upon initiating a regeneration cycle. Determination of the correct equation to use can be set and monitored in real-time. Alternatively or additionally, choice of determined equation to apply can be set with some time-lag in order to more accurately define the accumulated effects of operation to resulting conversion efficiency of the catalyst. Additionally, results acquired in real-time and applied through the determined equations can be checked after the fact to historical curves affecting conversion efficiency. Further, the determined equations can be set initially based upon behavior of a test system or vehicle. Alternatively or additionally, conversion efficiencies can be checked according to operation of units in the field, calibrated to measured values measured by sensors in the aftertreatment system or attached temporarily for the purpose of correcting the determined equations. In the event a NOx sensor or metrics capable of predicting NOx in the exhaust gas flow, such as in-cylinder pressure readings, are available, such measurements can be coupled with the methods described herein to provide corrective feedback. Also, by methods known in the art, equations in a particular aftertreatment system can be adjusted for use in the system and adjusted for changes to the system overtime through methods known in the art, such as through machine learning algorithms or fuzzy logic. Through these known methods, sources of error and deviation in the operation of the system from the initially determined equations can be corrected through adjustment over time.

As described above, a number of parameters are useful to tracking or predicting conversion efficiency according to the methods described herein. As described above, the temperature of the reaction on the catalyst is critical to understanding the rate at which the catalyst experiences reduced conversion efficiency. Temperature of the exhaust gas flow, either upstream or downstream of the HC-SCR device, or temperatures within the catalyst can be used to monitor or estimate the operative temperature within the device. Dosing rate, describing the presence of hydrocarbons and related contaminants within the HC-SCR device, is also important to understanding change in conversion efficiency within the device. Additionally, because poisoning of the catalyst is an accumulative process, time within each operating range is important to tracking or predicting conversion efficiency of the device.

Figure 9:
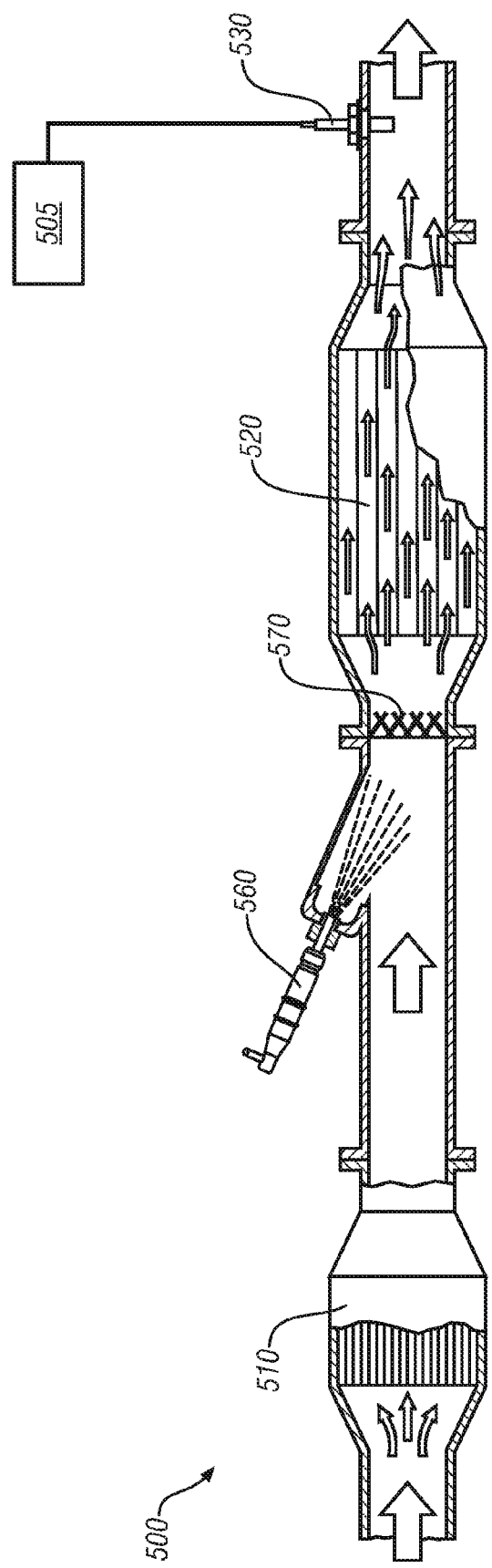

Measurement of temperature within an aftertreatment system for use in methods described herein can be taken from a number of locations within the aftertreatment system. FIGS. 7-9 schematically depict temperature measurements being taken from various points within the aftertreatment system, in accordance with the present disclosure. FIG. 7 graphically depicts aftertreatment system 300 comprising a control module 305, DOC 310, HC-SCR 320, upstream temperature sensor 330, and fuel dosing module 360. FIG. 8 graphically depicts aftertreatment system 400 comprising a control module 405, DOC 410, HC-SCR 420, in-catalyst temperature sensor 430, and fuel dosing module 460. FIG. 9 graphically depicts aftertreatment system 500 comprising a control module 505, DOC 510, HC-SCR 520, downstream temperature sensor 530, and fuel dosing module 560. Any location of temperature sensor within the aftertreatment system can be utilized so long as the temperature within the HC-SCR can be accurately estimated from the measurement. In the alternative, if metrics are available to allow accurate estimation or modeling of temperature within the HC-SCR device, for example, in-cylinder measurements providing detailed information regarding the combustion process and heat rejected through the exhaust system, a virtual temperature measurement can be synthesized and used for the methods described herein.

As described above, contamination or poisoning of the catalyst reduces the conversion efficiency of the catalyst. Once the conversion efficiency drops below a certain level, the catalyst can be said to be deactivated or no longer functioning. Once catalyst deactivation has occurred, a regeneration mode must be triggered to restore usefulness of the catalyst to treating NOx. The methods described herein can be employed to trigger regeneration, for example, in response to estimated conversion efficiency dropping below some threshold efficiency. This threshold can be a fixed number, for example, triggering regeneration in the event conversion efficiency drops below 50%. In the alternative, the threshold efficiency to trigger regeneration can be an adjustable number. For example, the estimated conversion efficiency is based upon accumulated estimations through iterative periods of operation until the initial conversion efficiency is reset. Threshold conversion efficiency can be set to a value required by government regulation, or the threshold can be based upon some value in excess of a government regulation. Because the conversion efficiency estimate can be based upon previous estimation, errors can build up in the conversion efficiency estimate. The threshold efficiency to trigger regeneration can account for this increasing error. For example, in any term of operation within ten hours of the last rest of initial conversion efficiency, the threshold conversion efficiency can be a 30%, and for each incremental 10 hours of operation, the threshold conversion efficiency can increase 5%. In this way, regeneration of the catalyst can include an increasing factor of safety over time to account for accumulating error in the conversion efficiency estimate.

Determined equations used in the methods described herein can be stored in a control module or any computerized module or reference device accessible to the control module controlling initiation of the regeneration cycle.

Figure 10:
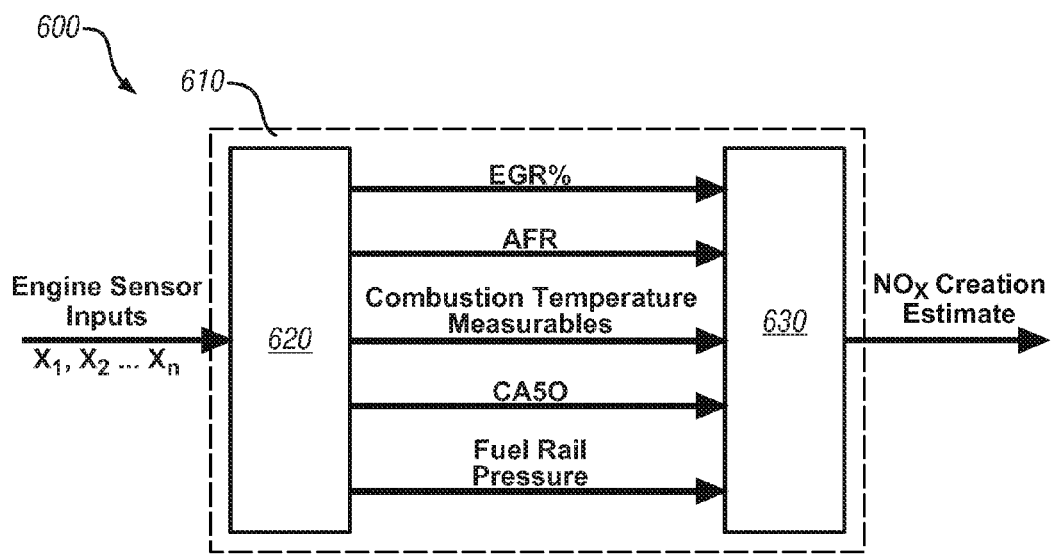
FIG. 10 schematically depicts an exemplary NOx model module, utilized within an engine control module and determining a NOx creation estimate, in accordance with the present disclosure.

Detection of NOx is important to understanding operation of the aftertreatment system and controlling NOx as a component to ammonia production. A NOx sensor or an oxygen sensor add cost and weight to a vehicle, and such sensors frequently require a particular operating temperature range, achieved after some warm-up time, to be functional. As described above a virtual NOx sensor can be used to estimate the presence of NOx in an aftertreatment system. FIG. 10 schematically depicts an exemplary NOx model module, utilized within an engine control module and determining a NOx creation estimate, in accordance with the present disclosure. Exemplary NOx model module 600 is operated within NOx creation estimating system 610 and comprises a model module 620 and a NOx estimation module 630. Engine sensor inputs $x_1$ through $x_n$ are inputs to the NOx model module and can include a number of factors, including temperatures, pressures, engine control settings including valve and spark timings, and other readings indicative of combustion state within the combustion chamber. Model module 620 receives these inputs and applies known relationships to determine a number of parameters to describe combustion within the combustion chamber. Examples of these descriptive parameters include EGR %, the percentage of exhaust gas diverted back into the combustion chamber in order to control the control the combustion process; an air-fuel charge ratio (AFR) describing the mixture of air and fuel present in the combustion chamber; combustion temperature measurables, including, for example, either combustion burned gas temperature or average combustion temperature; a combustion timing measurable tracking the progress of combustion through a combustion process, for example CA50, a measurement of at what crank angle 50% of the mass of fuel originally present in the combustion chamber is combusted; and fuel rail pressure, indicating the pressure of fuel available to fuel injectors to be sprayed into the combustion chamber. These descriptive parameters can be used to estimate conditions present within the combustion chamber through the combustion process. As described above, conditions present within the combustion chamber affect the creation of NOx in the combustion process. These descriptive parameters can be fed to NOx estimation module 630, wherein programmed calculations utilize the descriptive parameters as inputs to generate an estimate of NOx creation due to the combustion process. However, as described above, models analyzing variable descriptive of the combustion process can include complex calculations which can take longer to calculate than required for generating real-time results, require large amounts of processing capability, and are only as accurate as the pre-programmed algorithm permits. As a result of these challenges and a need for accurate and timely information, estimation of NOx creation within an ECM as part of an aftertreatment control strategy is not preferable.

Monitoring NOx through a virtual NOx sensor can require monitoring of the combustion process to accurately estimate NOx production from the engine. Additionally, accurate control of multiple injections, as described in the method above, can be aided by monitoring the combustion process. A variety of engine sensor inputs can be used to quantify parameters descriptive of the combustion process. However, combustion occurring within the engine is difficult to directly monitor. Sensors may detect and measure fuel flow and air flow into the cylinder, a sensor may monitor a particular voltage being applied to a spark plug or a processor may gather a sum of information that would predict conditions necessary to generate an auto-ignition, but these readings together are merely predictive of combustion and do not measure actual combustion results. One exemplary method measuring actual combustion results utilizes pressure measurements taken from within the combustion chamber through a combustion process. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion process may be described as an estimated state of combustion. By estimating the state of the combustion process for a cylinder, factors affecting NOx creation through the combustion process can be determined and made available for use in NOx creation estimation.

Figure 11:
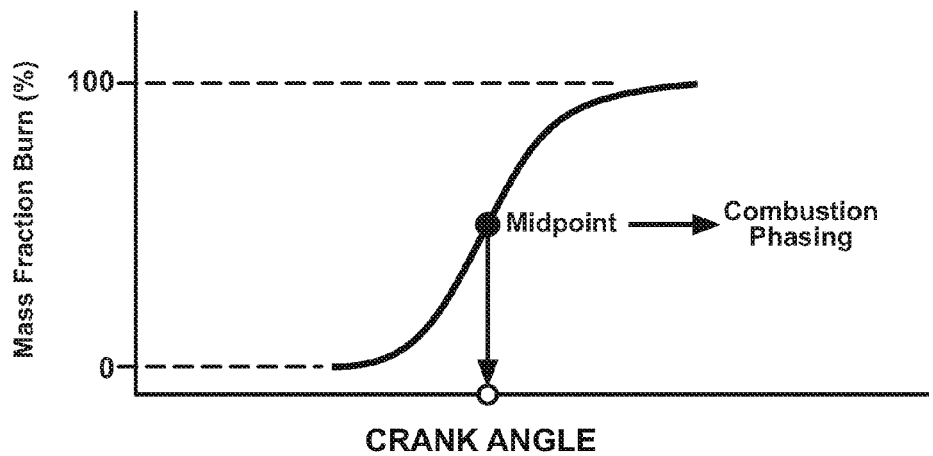
FIG. 11 graphically illustrates an exemplary mass fraction burn curve, in accordance with the present disclosure.

One known method for monitoring combustion phasing is to estimate the mass fraction burn ratio for a given crank angle based upon known parameters. The mass fraction burn ratio describes what percentage of the charge in the combustion chamber has been combusted and serves as a good estimate of combustion phasing. FIG. 11 graphically illustrates an exemplary mass fraction burn curve in accordance with the present disclosure. For a given crank angle, the curve depicted describes the estimated percentage of fuel air mixture within the charge that has been combusted for that combustion process. In order to be used as a metric of combustion phasing, it is known to identify either a particular mass fraction burn percentage of interest or a particular crank angle of interest. FIG. 11 identifies CA50% as a crank angle at which the mass fraction burn equals 50%. By examining this particular metric across a plurality of combustion processes in this cylinder or across a number of cylinders, the comparative phasing of the particular combustion processes may be described.

As described above, combustion phasing can be utilized to estimate the state of a particular combustion process. An exemplary method for monitoring combustion phasing to diagnose ineffective combustion is disclosed whereby combustion in an engine is monitored, mass fraction burn ratios are generated for each cylinder combustion process, and the combustion phasing across the cylinders are compared. If the combustion phase for one cylinder at a particular crank angle for that first cylinder differs by more than a threshold phase difference from the combustion phase for another cylinder at the same crank angle for that second cylinder, anomalous combustion can be inferred. Many sources of anomalous combustion may be diagnosed by this method. For example, if some condition causes early ignition or knocking within the combustion chamber, the cylinder pressure readings will exhibit different values than normal combustion. Additionally, fuel system injection timing faults, causing injection of the charge at incorrect timing, will cause anomalous cylinder pressure readings. Further, if a cylinder misfires or never achieves combustion, the cylinder pressure readings will exhibit different values than normal combustion. Similarly, pressure curves may be used to diagnose other abnormal combustion conditions, such as changes in the air fuel mixture, changes in camshaft phasing, and maintenance failures to related components. Any such diagnoses of combustion health have implications to NOx and can be useful to estimate NOx creation.

Many methods are known to estimate mass fraction burn. One method examines pressure data from within the combustion chamber, including analyzing the pressure rise within the chamber attributable to combustion. Various methods exist to quantify pressure rise in a cylinder attributable to combustion. Pressure ratio management (PRM) is a method based upon the Rassweiler approach, which states that mass fraction burn may be approximated by the fractional pressure rise due to combustion. Combustion of a known charge at a known time under known conditions tends to produce a consistently predictable pressure rise within the cylinder. PRM derives a pressure ratio (PR) from the ratio of a measured cylinder pressure under combustion at a given crank angle ($P_{CYL}(\theta)$) to a calculated motored pressure, estimating a pressure value if no combustion took place in the cylinder, at a given crank angle ($P_{MOT}(\theta)$), resulting in the following equation.

$$PR(\theta) = \frac{P_{CYL}(\theta)}{P_{MOT}(\theta)} \qquad [5]$$

Figure 12:
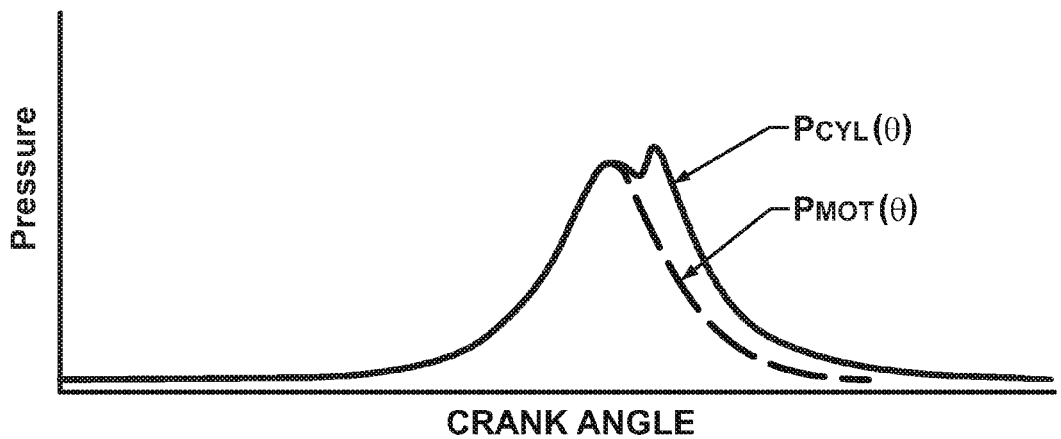
FIG. 12 graphically illustrates an exemplary cylinder pressure plotted against crank angle through a combustion process, in accordance with the present disclosure.

FIG. 12 graphically illustrates an exemplary cylinder pressure plotted against crank angle through a combustion process, in accordance with the present disclosure. $P_{MOT}(\theta)$ exhibits a smooth, inverse parabolic peak from the piston compressing a trapped pocket of gas without any combustion. All valves are closed with the piston at BDC, the piston rises compressing the gas, the piston reaches TDC at the peak of the pressure curve, and the pressure reduces as the piston falls away from TDC. A rise in pressure above $P_{MOT}(\theta)$ is depicted by $P_{CYL}(\theta)$. The timing of combustion will vary from application to application. In this particular exemplary curve, $P_{CYL}(\theta)$ begins to rise from $P_{MOT}(\theta)$ around TDC, describing an ignition event sometime before TDC. As the charge combusts, heat and work result from the combustion, resulting in an increase in pressure within the combustion chamber. PR is a ratio of $P_{MOT}$ to $P_{CYL}$, and $P_{MOT}$ is a component of $P_{CYL}$. Net combustion pressure (NCP($\theta$)) is the difference between $P_{CYL}(\theta)$ and $P_{MOT}(\theta)$ or the pressure rise in the combustion chamber attributable to combustion at a given crank angle. It will be appreciated that by subtracting one from PR, a ratio of NCP to $P_{MOT}$ may be determined.

$$PR(\theta) - 1 = \frac{P_{CYL}(\theta)}{P_{MOT}(\theta)} - \frac{P_{MOT}(\theta)}{P_{MOT}(\theta)} = \frac{NCP(\theta)}{P_{MOT}(\theta)} \qquad [6]$$

PR measured through the equation above therefore may be used to directly describe the strength of combustion within a cylinder. Normalizing PR minus one at crank angle $\theta$ to an expected or theoretical maximum PR value minus one yields a fractional pressure ratio of the pressure rise due to combustion at crank angle $\theta$ to the expected total pressure rise due to combustion at the completion of the combustion process. This normalization can be expressed by the following equation.

$$FPR(\theta) = \frac{PR(\theta) - 1}{PR(90°) - 1} \propto MassFractionBurn(\theta) \qquad [7]$$

This fractional pressure ratio, by equating pressure rise attributable to combustion to the progression of combustion, describes the mass fraction burn for that particular combustion process. By utilizing PRM, pressure readings from a cylinder may be used to estimate mass fraction burn for that cylinder.

The above method utilizing PRM is applicable for broad ranges of temperature, cylinder charge and timings associated with compression ignition engines, with the added benefit of not requiring calibrated pressure sensors. Because PR is a ratio of pressures, a non-calibrated linear pressure transducer may be utilized to acquire pressure data readings from each cylinder.

Another method to estimate mass fraction burn is to directly utilize the Rassweiler approach to determine mass fraction burn by calculating the total heat released for a given crank angle. The Rassweiler approach utilizes pressure readings from a cylinder to approximate the incremental heat release in the cylinder. This approach is given by the following equation.

$$Q_{Released}(\theta) = \sum P_{k+1} - P_{k-1}\left(\frac{V_{k-1}}{V_k}\right)^r \quad [8]$$

Mass fraction burn, a measure of how much of the charge has been combusted by a certain crank angle, may be approximated by determining what fraction of heat release for a combustion process has taken place at a given crank angle. The incremental heat release determined by the Rassweiler approach may be summed over a range of crank angles, compared to the total expected or theoretical heat release for the combustion process, and utilized to estimate mass fraction burn. For example, if 75% of the total expected heat release has been realized for a given crank angle, we can estimate that 75% of the combustion for the cycle has taken place at that crank angle.

Other methods may be used to estimate mass fraction burn. One method quantifies the rate of change of energy within the combustion chamber due to combustion through an analysis of classical heat release measures based on analysis of the heat released and work performed through the combustion of the charge. Such analyses are focused on the First Law of Thermodynamics, which states that the net change on energy in a close system is equal to the sum of the heat and work added to the system. Applied to a combustion chamber, the energy increase in the combustion chamber and the enclosed gases equals the heat transferred to the walls of the chamber and the gases plus the expansive work performed by the combustion.

An exemplary method utilizing these classic heat release measures to approximate a mass fraction burn estimate analyzes the rate of heat release by charge combustion throughout combustion process. This rate of heat release, $dQ_{ch}/d\theta$, may be integrated over a range of crank angles in order to describe the net energy released in the form of heat. Through derivations well known in the art, this heat release may be expressed through the following equation.

$$Q = \int \frac{dQ_{ch}}{d\theta} = \int \left(\frac{\gamma}{\gamma-1} p \frac{dV}{d\theta} + \frac{1}{\gamma-1} V \frac{dp}{d\theta}\right) \quad [9]$$

Gamma, $\gamma$, comprises a ratio of specific heats and is nominally chosen as that for air at the temperature corresponding to those used for computing the signal bias and without EGR. Thus, nominally or initially $\gamma=1.365$ for diesel engines and nominally $\gamma=1.30$ for conventional gasoline engines. These can however be adjusted based on the data from the specific heats for air and stoichiometric products using an estimate of the equivalence ratio, $\phi$, and EGR molar fraction targeted for the operating condition and using the relation that $[\gamma=1+(R/c_v)]$, wherein R is the universal gas constant, and the weighted average of air and product properties through the following expression.

$$c_v(T) = (1.0 - \phi*EGR)*c_{vair}(T) + (\phi*EGR)*c_{vstoichprod}(T) \quad [10]$$

With the expression evaluated at the gas temperature corresponding to that for pressures sampled for the computation of signal bias.

Whether calculated through the preceding method or by some other method known in the art, the calculation of energy released within the combustion process for a given crank angle may be compared to an expected or theoretical total energy release for the combustion process. This comparison yields an estimate of mass fraction burn for use in describing combustion phasing.

The methods described hereinabove are readily reduced to be programmed into a microcontroller or other device for execution during ongoing operation of an internal combustion engine, as follows.

Once a mass fraction burn curve is generated for a particular combustion process, the curve is useful to evaluate the combustion phasing for that particular combustion process. Referring again to FIG. 11, a reference point is taken from which to compare mass fraction burn estimates from different combustion processes. In this particular embodiment, CA50%, representing the crank angle at which 50% of the charge is combusted, is selected. Other measures can be selected so long as the same measure is used for every comparison.

Determination of mass fraction burn values is a practice well known in the art. Although exemplary methods are described above for determining mass fraction burn, the methods disclosed herein to utilize mass fraction burn values to diagnose cylinder combustion issues may be used with any method to determine mass fraction burn. Any practice for developing mass fraction burn may be utilized, and this disclosure is not intended to be limited to the specific methods described herein.

Additional methods exist to analyze cylinder pressure signals. Methods are known for processing complex or noisy signals and reducing them to useful information. One such method includes spectrum analysis through Fast Fourier Transforms (FFT). FFTs reduce a periodic or repeating signal into a sum of harmonic signals useful to transform the signal into the components of its frequency spectrum. Once the components of the signal have been identified, they may be analyzed and information may be taken from the signal.

Pressure readings from the pressure transducers located in or in communication with the combustion cylinders contain information directly related to the combustion occurring within the combustion chamber. However, engines are very complex mechanisms, and these pressure readings can contain, in addition to a measure of $P_{CYL}(\theta)$, a multitude of pressure oscillations from other sources. Fast Fourier Transforms (FFTs) are mathematical methods well known in the art. One FFT method known as spectrum analysis analyzes a complex signal and separates the signal into its component parts which may be represented as a sum of harmonics. Spectrum analysis of a pressure transducer signal represented by f(θ) may be represented as follows.

$$FFT(f(\theta)) = A_0 + (A_1 \sin(\omega_0 \theta + \phi_1)) + \\ (A_2 \sin(2\omega_0 \theta + \phi_2)) + \ldots + (A_N \sin(N\omega_0 \theta + \phi_N))$$ [11]

Each component N of the signal f(θ) represents a periodic input on the pressure within the combustion chamber, each increasing increment of N including signals or higher frequency. Experimental analysis has shown that the pressure oscillation caused by combustion and the piston moving through the various stages of the combustion process, $P_{CYL}(\theta)$, tends to be the first, lowest frequency harmonic. By isolating this first harmonic signal, $P_{CYL}(\theta)$ can be measured and evaluated. As is well known in the art, FFTs provide information regarding the magnitude and phase of each identified harmonic, captured as the φ term in each harmonic of the above equation. The angle of first harmonic, or $\phi_1$, is, therefore, the dominant term tracking combustion phasing information. By analyzing the component of the FFT output related to $P_{CYL}$, the phasing information of this component can be quantified and compared to either expected phasing or the phasing of other cylinders. This comparison allows for the measured phasing values to be evaluated and a warning indicated if the difference is greater than a threshold phasing difference, indicating combustion issues in that cylinder.

Signals analyzed through FFTs are most efficiently estimated when the input signal is at steady state. Transient effects of a changing input signal can create errors in the estimations performed. While methods are known to compensate for the effects of transient input signals, the methods disclosed herein are best performed at either idle or steady, average engine speed conditions in which the effects of transients are eliminated. One known method to accomplish the test in an acceptably steady test period is to take samples and utilize an algorithm within the control module to either validate or disqualify the test data as being taken during a steady period of engine operation.

It should be noted that although the test data is preferably taken at idle or steady engine operation, information derived from these analyses can be utilized by complex programmed calculations or engine models to effect more accurate engine control throughout various ranges of engine operation. For example, if testing and analysis at idle shows that cylinder number four has a partially clogged injector, fuel injection timing could be modified for this cylinder throughout different ranges of operation to compensate for the perceived issue.

Once cylinder pressure signals have been analyzed through FFTs, information from the pressure signal can be used in variety of ways to analyze the combustion process. For example, the analyzed pressure signal can be used to generate a fractional pressure ratio as discussed in methods above and used to describe the mass fraction burn percentage to describe the progress of the combustion process.

Once a measure such as pressure readings are available, other descriptive parameters relating to a combustion process can be calculated. Sub-models describing particular characteristics of a combustion process can be employed utilizing physical characteristics and relationships well known in the art to translate cylinder pressures and other readily available engine sensor terms into variable descriptive of the combustion process. For example, volumetric efficiency, a ratio of air-fuel charge entering the cylinder as compared to the capacity of the cylinder, can be expressed through the following equation.

$$\eta_{VE} = f(RPM, P_{im}, \dot{m}_a)$$ [12]

RPM, or engine speed, is easily measurable through a crankshaft speed sensor, as describe above. $P_{im}$, or intake manifold pressure, is typically measured as related to engine control, and is a readily available term. $\dot{m}_a$, or the fresh mass air flow portion of the charge flowing into the cylinder, is also a term frequently measured in the air intake system of the engine or can alternatively be easily derived from $P_{im}$, ambient barometric pressure, and known characteristics of the air intake system. Another variable descriptive of the combustion process that can be derived from cylinder pressures and other readily available sensor readings is charge flow into the cylinder, $\dot{m}_c$. $\dot{m}_c$ can be determined by the following equation.

$$\dot{m}_c = \frac{P_{im} \cdot rpm \cdot D \cdot \eta}{2RT_{im}}$$ [13]

D equals the displacement of the engine. R is a gas constant well known in the art. $T_{im}$ is a temperature reading from the inlet manifold. Another variable descriptive of the combustion process that can be derived from cylinder pressures and other readily available sensor readings is EGR %, or the percentage of exhaust gas being diverted into the exhaust gas recirculation circuit. EGR % can be determined by the following equation.

$$EGR\% = 1 - \frac{\dot{m}_a}{\dot{m}_c}$$ [14]

Yet another variable descriptive of the combustion process that can be derived from cylinder pressures and other readily available sensor readings is CAx, wherein x equals a desired fractional pressure ratio. CAx can be determined by the following equation.

$$Z = \frac{P_{CYL}(\theta)}{P_{MOT}(\theta)} - 1$$ [15]

Filling in the desired fractional pressure ratio as Z and solving for θ yields CAx. For instance CA50 can be determined as follows.

$$\frac{P_{CYL}(\theta)}{P_{MOT}(\theta)} = 1.5$$ [16]

Figure 13:
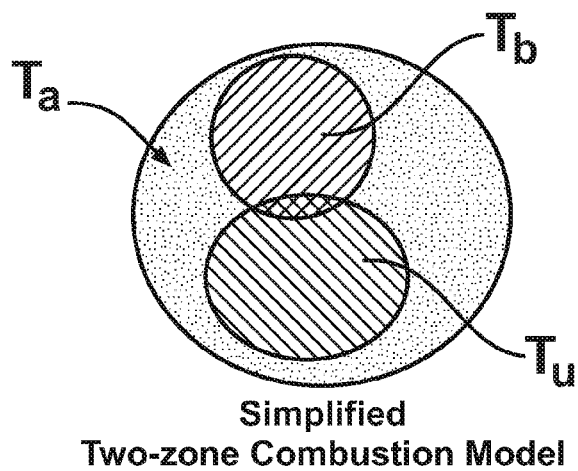
FIG. 13 depicts a number of different temperatures capable of estimation within the combustion chamber important to describing the combustion process, in accordance with the present disclosure.

Various temperatures within the combustion chamber can also be estimated from cylinder pressures and other readily available sensor readings. FIG. 13 depicts a number of different temperatures capable of estimation within the combustion chamber important to describing the combustion process, in accordance with the present disclosure. $T_a$, the average temperature within the combustion chamber can be determined by the following equation.

$$T_a = \frac{P_{max} \cdot V(PPL)}{1.05 * \dot{m}_c R} \quad [17]$$

$P_{max}$ is the maximum pressure achieved within the combustion chamber through the combustion process. PPL is a measure of the crank angle at which $P_{max}$ occurs. V(PPL) is the volume of the cylinder at the point $P_{max}$ occurs. $T_u$, the average temperature of the not yet combusted or unburned portion of the charge within the combustion chamber, can be determined by the following equation.

$$T_u = \frac{1.05 * \dot{m}_c}{1.05 * \dot{m}_c - \alpha \cdot \dot{m}_f \lambda_S} [0.05 \beta T_{ex} + 0.95 T_{im}] \left( \frac{P_{max} - \Delta P}{P_{im}} \right)^{\frac{r-1}{r}} \quad [18]$$

$\dot{m}_f$ is the fuel mass flow, and can be determined either from a known fuel rail pressure in combination with known properties and operation of the fuel injectors or from $\dot{m}_c$ and $\dot{m}_a$. $\alpha$ and $\beta$ are calibrations based on engine speed and load and may be developed experimentally, empirically, predictively, through modeling or other techniques adequate to accurately predict engine operation, and a multitude of calibration curves might be used by the same engine for each cylinder and for different engine settings, conditions, or operating ranges. $\lambda_S$ is the stoichiometric air-fuel ratio for the particular fuel and includes values well known in the art. $T_{ex}$ is a measured exhaust gas temperature. $T_{im}$ and $P_{im}$ are temperature and pressure readings taken at the intake manifold. $P_{max} - \Delta P$ describes the pressure in the combustion chamber just before the start of combustion. $\gamma$ is a specific heat constant described above. $T_b$, the average temperature of the combusted or burned portion of the charge within the combustion chamber, can be determined by the following equation.

$$T_b = \frac{T_a - (1 - x_b) T_u}{x_b}, \quad [19]$$

$$x_b = \frac{\alpha \cdot \dot{m}_f (1 + \lambda_S)}{1.05 \dot{m}_c}$$

Note that the above equations are simplified in a method well known in the art by neglecting heat loss to cylinder wall. Methods to compensate for this simplification are well known in the art and will not be described in detail herein. Through the use of the aforementioned relationships and derivations, cylinder pressure and other readily available sensor readings can be used to determine a number of parameters descriptive of the combustion process being monitored.

Figure 14:
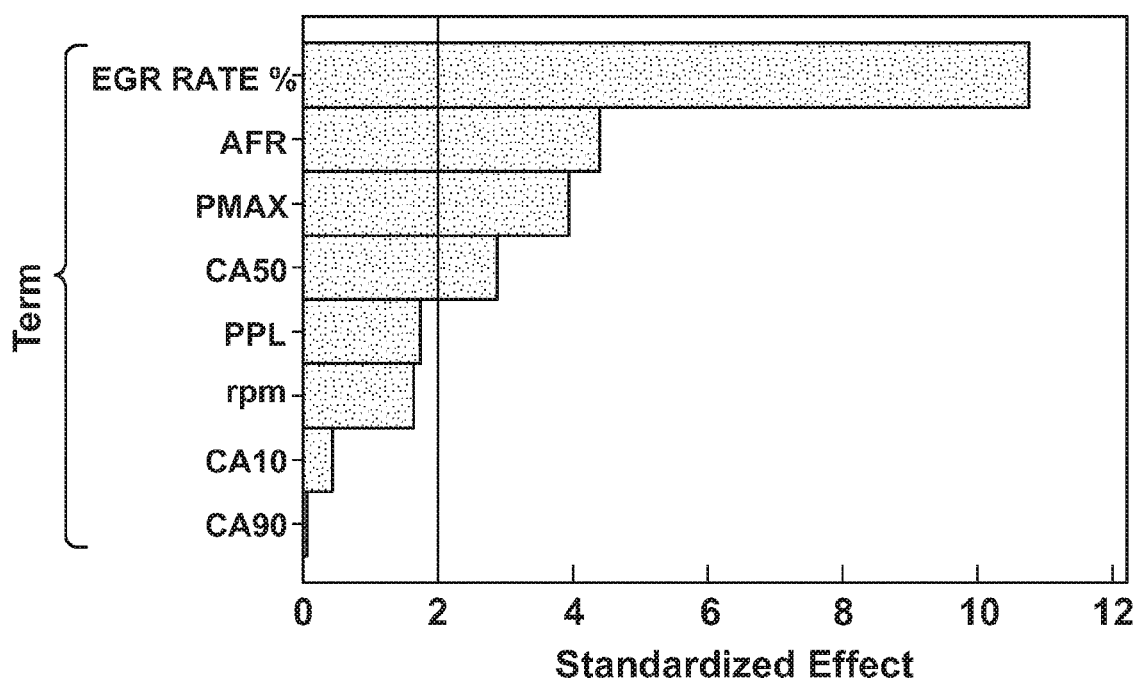
FIG. 14 is a graphical depiction of exemplary modeled results describing standardized effects of a number of inputs to NOx emissions under a given set of conditions, in accordance with the present disclosure.

As described above, cylinder pressure readings can be used to describe a state of combustion occurring within the combustion chamber for use as a factor in estimating NOx creation. Also as described above, a number of other factors are important to accurately estimating NOx creation. FIG. 14 is a graphical depiction of exemplary modeled results describing standardized effects of a number of inputs to NOx emissions under a given set of conditions, in accordance with the present disclosure. As described above, methods are known utilizing a model module and a NOx estimation module to simulate or estimate NOx creation based upon known characteristics of an engine. The model utilized to characterize NOx creation by a combustion process in this particular exemplary analysis can be characterized by the following expression.

$$NOx = NNT(Pmax, CA50, CApmax, EGR\%, AFR) \quad [20]$$

As shown in the graphical results of FIG. 14, a number of factors have varying effects on NOx creation. Under this particular set of conditions, EGR % has the largest impact upon NOx creation for the engine modeled. In this instance, by methods well known in the art, recirculating a particular amount of exhaust gas back into the combustion chamber through the EGR circuit lowers the adiabatic flame temperature of the combustion process, thereby lowering the temperatures that nitrogen and oxygen molecules are exposed to during combustion and, thereby, lowering the rate of NOx creation. By studying such models under various engine operating conditions, the neural network can be provided with the most useful inputs to provide accurate estimates of NOx creation. Additionally, studying such models provides information useful to selecting input data to initially train the neural network, varying inputs and providing corresponding outputs to sensor inputs and descriptive parameters most likely to impact NOx creation.

Figure 15:
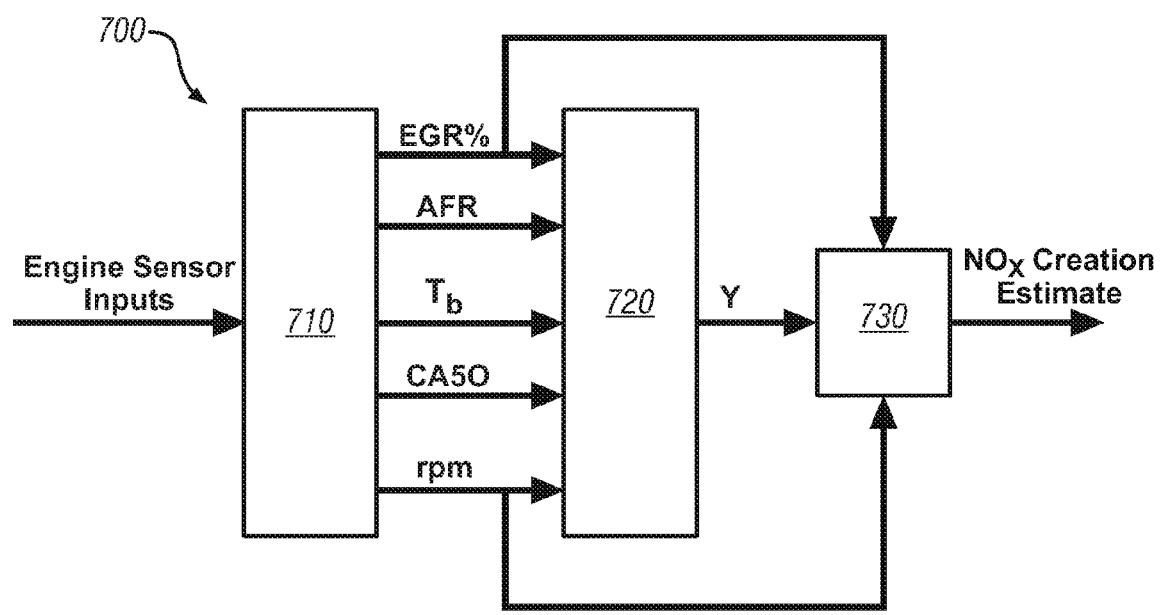
FIG. 15 schematically depicts an exemplary system generating a NOx creation estimate, utilizing models within a neural network to generate NOx creation estimates and including a dynamic model module to compensated NOx creation estimates for the effects of dynamic engine and vehicle conditions, in accordance with the present disclosure.

By methods described above, NOx creation estimates can be generated for a set of engine sensor inputs. As will be appreciated by one having ordinary skill in the art, equations and model predictions of engine operation frequently operate most effectively when the engine is operating at or near steady state However, observations and predictions can be made regarding the effects of transient or dynamic engine operation upon NOx creation estimates or the accuracy thereof. An exemplary expression describing a dynamic model or dynamic filtering module is shown by the following.

$$\frac{d NOx}{dt} = f(NOx, y, EGR\%, AFR, Ta, RPM) \quad [21]$$

wherein contemporary NOx readings and an output y from a trained neural network are utilized to estimate a change in NOx creation. Such a change variable can be used to incrementally estimate NOx creation or can be used to check or filter NOx creation estimations. FIG. 15 schematically depicts an exemplary system generating a NOx creation estimate, utilizing models within a neural network to generate NOx creation estimates and including a dynamic model module to compensated NOx creation estimates for the effects of dynamic engine and vehicle conditions, in accordance with the present disclosure. NOx creation estimate system 700 comprises a model module 710, a neural network module 720, and a dynamic model module 730. Factors under current operating conditions most likely to impact NOx creation estimation under dynamic or changing conditions can be determined experimentally, empirically, predictively, through modeling or other techniques adequate to accurately predict engine operation. Inputs relating to these factors are fed to dynamic model module 730 along with output from neural network module 720, and the raw output from the neural network can be adjusted, filtered, averaged, de-prioritized or otherwise modified based upon the projected effects of the dynamic conditions determined by dynamic model module 730. In this way, the effects of dynamic engine or vehicle operation conditions can be accounted for in the estimation of NOx creation.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for initiating a regeneration mode in a selective catalytic reduction device of an aftertreatment system utilizing hydrocarbons as a reductant, comprising:
monitoring a temperature within said aftertreatment system;
monitoring a fuel dosing rate to said selective catalytic reduction device;
monitoring an initial conversion efficiency;
creating a plurality of determined equations by fitting a curve to test data to estimate changes in a conversion efficiency of said selective catalytic reduction device over time, each determined equation defined for a respective temperature range;
selecting one of the plurality of determined equations based upon said monitored temperature and said monitored fuel dosing rate;
estimating changes in said conversion efficiency based upon said equation and said initial conversion efficiency; and
initiating a regeneration mode for said selective catalytic reduction device based upon said estimated changes in conversion efficiency.

2. The method of claim 1, wherein monitoring said initial conversion efficiency comprises:
resetting said initial conversion efficiency when said selective catalytic reduction device completes a full regeneration.

3. The method of claim 1, wherein monitoring said initial conversion efficiency comprises:
resetting said initial conversion efficiency to an estimated conversion efficiency when said selective catalytic reduction device undergoes a partial regeneration.

4. The method of claim 1, wherein estimating changes in said conversion efficiency comprises:
defining a time period through which said equation is operative based upon said monitored temperature and said fuel dosing rate; and
accumulatively estimating changes in said conversion efficiency through said time period.

5. The method of claim 4, further comprising:
defining a second time period through which a second equation is operative based upon said monitored temperature and said fuel dosing rate; and
accumulatively estimating changes in said conversion efficiency through said time period based upon said estimated conversion efficiency at a start of said new time period and said second equation through said second time period.

6. The method of claim 1, wherein initiating said regeneration mode is based upon said estimated conversion efficiency falling below a threshold conversion efficiency.

7. Method for initiating a regeneration mode in a selective catalytic reduction device of an aftertreatment system utilizing hydrocarbons as a reductant, comprising:
monitoring a temperature within said aftertreatment system;
monitoring a fuel dosing rate to said selective catalytic reduction device;
monitoring an initial conversion efficiency comprising resetting said initial conversion efficiency when said selective catalytic reduction device completes a full regeneration;
selecting an equation to estimate changes in a conversion efficiency of said selective catalytic reduction device based upon said monitored temperature and said monitored fuel dosing rate;
estimating changes in said conversion efficiency based upon said equation and said initial conversion efficiency; and
initiating a regeneration mode for said selective catalytic reduction device based upon said conversion efficiency falling below a threshold conversion efficiency, wherein said threshold conversion efficiency increases based upon increasing time of operation since said resetting.

8. Method for initiating a regeneration mode in a selective catalytic reduction device of an aftertreatment system utilizing hydrocarbons as a reductant, comprising:
monitoring a temperature within said aftertreatment system;
monitoring a fuel dosing rate to said selective catalytic reduction device;
monitoring an initial conversion efficiency comprising resetting said initial conversion efficiency to an estimated conversion efficiency when said selective catalytic reduction device undergoes a partial regeneration;
selecting an equation to estimate changes in a conversion efficiency of said selective catalytic reduction device based upon said monitored temperature and said monitored fuel dosing rate;
estimating changes in said conversion efficiency based upon said equation and said initial conversion efficiency; and
initiating a regeneration mode for said selective catalytic reduction device based upon said conversion efficiency falling below a threshold conversion efficiency, wherein said threshold conversion efficiency increases based upon increasing time of operation since said resetting.

9. The method of claim 1, wherein said monitored temperature comprises an exhaust gas flow temperature upstream of said selective catalytic reduction device.

10. The method of claim 1, wherein said monitored temperature comprises an exhaust gas flow temperature downstream of said selective catalytic reduction device.

11. The method of claim 1, wherein said monitored temperature comprises a catalyst temperature of said selective catalytic reduction device.

12. Method for estimating conversion efficiency for use in controlling a selective catalytic reduction device of an aftertreatment system utilizing hydrocarbons as a reductant, comprising:
monitoring a temperature within said aftertreatment system;
monitoring a fuel dosing rate to said selective catalytic reduction device;
monitoring an initial conversion efficiency;
creating plurality of determined equations by fitting a curve to test data to estimate changes in a conversion efficiency of said selective catalytic reduction device over time, each determined equation defined for a respective temperature range;
selecting one of the plurality of determined equations based upon said monitored temperature and said monitored fuel dosing rate;
accumulatively estimating changes in said conversion efficiency at a desired time based upon said equation and said initial conversion efficiency; and
initiating a regeneration mode for said selective catalytic reduction device based upon said estimated changes in conversion efficiency.

13. The method of claim 12, wherein said monitored temperature comprises an exhaust gas flow temperature upstream of said selective catalytic reduction device.

14. The method of claim 12, wherein said monitored temperature comprises an exhaust gas flow temperature downstream of said selective catalytic reduction device.

15. The method of claim 12, wherein said monitored temperature comprises a catalyst temperature of said selective catalytic reduction device.

16. Method for estimating conversion efficiency for use in controlling an operative selective catalytic reduction device of an aftertreatment system utilizing hydrocarbons as a reductant, comprising:

testing an exemplary selective catalytic reduction device operatively similar to said operative selective catalytic reduction device, said testing comprising:

iteratively operating said exemplary selective catalytic reduction device through periods of operation with various temperatures and fuel dosing rates; and monitoring conversion efficiency of said exemplary selective catalytic reduction device through each of said periods;

determining a plurality of equations by fitting a curve to said monitored conversion efficiency representative of changes to said conversion efficiency for each of said periods, each determined equation defined for a respective temperature range;

utilizing one of said plurality of determined equations to track changes in conversion efficiency in said operative selective catalytic reduction device; and controlling initiation of a regeneration mode in said operative selective catalytic reduction device based upon said tracked conversion efficiency.

* * * * *